Dec. 31, 1929.　　　　B. LONG　　　　1,741,469
ELECTRIC FURNACE
Filed Aug. 9, 1928
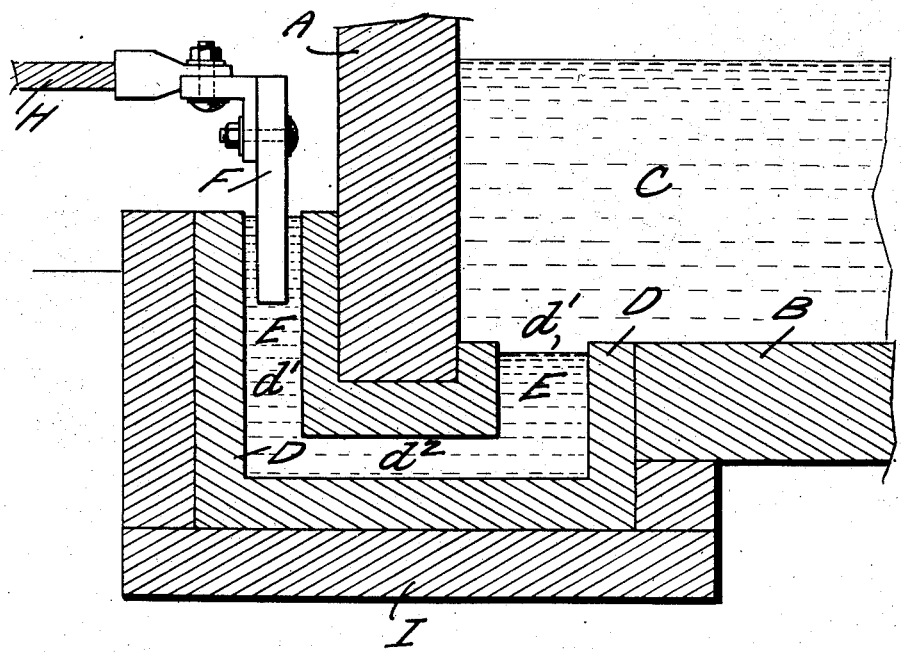
INVENTOR.
BERNARD LONG,
BY
ATTORNEYS.

Patented Dec. 31, 1929

1,741,469

UNITED STATES PATENT OFFICE

BERNARD LONG, OF PARIS, FRANCE, ASSIGNOR TO SOCIÉTÉ ANONYME DES MANUFACTURES DES GLACES & PRODUITS CHIMIQUES DE ST.-GOBAIN, CHAUNY & CIREY, OF PARIS, FRANCE

ELECTRIC FURNACE

Application filed August 9, 1928, Serial No. 298,555, and in France August 19, 1927.

This invention has for its object to provide means for conducting current to the glass melted in an electric glass furnace in which the glass is the resistance element. Metallic or carbon electrodes now used for this purpose are subject to attack from the glass batch and also from the high heat of fusion. To avoid injurious consequences from these agencies, I propose to use electrodes of a metal heavier than the glass and resistant to attack therefrom, and which is fluid at the temperature at which the glass melts, in contact with the molten glass, within the furnace and extending to the exterior thereof, when they are suitably connected with proper leading-in wires. My invention is set forth in the following specification and claims.

Referrring to the accompanying drawing in which corresponding parts are designated by corresponding marks of reference, A represents the side wall, and B the bottom of a suitable container, such as a tank, in which glass C may be melted. Adjacent to the junction of the side and bottom is a block D, having in its inner and outer ends, wells $d'$ connected by a horizontal passage $d^2$. A metal, such as tin, resistant to attack from the molten glass, and fusible under the conditions present at its location, is contained within the wells and passage, and serves as an electrode. The outer well extending upwardly above the bottom of the furnace to an extent to permit the weight of the metal column therein to be equal to the weight of the column of metal in the inner well plus the hydrostatic pressure due to the head of glass in the tank on the surface of the last named column. A suitable leading-in element F is contained in the metal in the outer well, and is attached to a conductor H. The block D may be jacketed as at I to maintain the metal therein in a fluid condition.

One or more blocks with associated parts may be placed at selected points of the furnace, which may also be provided with other means of heating it, either initially to melt the batch, or to aid the electrical melting, the construction used being always such that current passing through the conductor H will also flow through the glass C.

Under conditions of use, the metal in the inner well of the block C will be maintained in a molten condition by the heat of the glass above it, and by the heat of the tank bottom and side, but as it is covered by the molten glass, to which it is resistant, it will not oxide. If tin is selected for the metal, it will generally be found that the metal in the outer well will also be in molten condition, and that the temperature at that point will be sufficiently low to permit the use of a copper lead-in F, without trouble.

Having thus described my invention what I claim is:—

1. In an electric furnace, an electrode of a metal not attacked by molten glass and fusible at the melting temperature thereof, projecting into the furnace and extending to the outside thereof.

2. In an electric furnace an electrode of molten metal projecting into the furnace and extending to the outside thereof.

3. In an electric furnace, the combination of an electrode, of a metal not attacked by molten glass and fusible at the melting temperature thereof, a refractory passage confining the electrode, and a lead-in terminal connected to the electrode at the outer end thereof.

4. The combination in an electric furnace, of a well in the bottom thereof, a well exterior of the furnace having its upper end above the level of the bottom of the furnace, a passage connecting the two wells, an electrode of a metal not attacked by molten glass and fusible at the melting temperature thereof, contained within the well and passage, and a lead-in entering the outer well.

In testimony whereof I hereunto affix my signature.

BERNARD LONG.